(12) United States Patent
Kuga

(10) Patent No.: US 6,178,273 B1
(45) Date of Patent: *Jan. 23, 2001

(54) IMAGE FORMING APPARATUS FOR STORING DOCUMENT IMAGE IN MEMORY BY ONE DOCUMENT FEEDING OPERATION AND THE METHOD THEREOF

(75) Inventor: Masato Kuga, Kawasaki (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/935,028

(22) Filed: Sep. 22, 1997

(30) Foreign Application Priority Data

Sep. 30, 1996 (JP) .................................................. 8-259510

(51) Int. Cl.$^7$ ............................................. G06K 9/54

(52) U.S. Cl. ........................ 382/305; 382/284; 358/401; 358/404

(58) Field of Search ............................ 382/305, 284, 382/318, 312; 358/401, 404, 498, 450, 486

(56) References Cited

U.S. PATENT DOCUMENTS

| 4,792,827 | 12/1988 | Ogura ........................................ 355/14 |
| 5,225,914 | 7/1993 | Saito ......................................... 358/404 |
| 5,465,163 | 11/1995 | Yoshihara et al. ...................... 358/444 |
| 5,526,096 | 6/1996 | Imada ...................................... 355/218 |
| 5,719,685 | * 2/1998 | Kimura et al. ......................... 358/401 |
| 5,726,762 | * 3/1998 | Akada et al. ........................... 358/401 |
| 5,901,278 | * 5/1999 | Kurihara et al. ....................... 358/404 |

FOREIGN PATENT DOCUMENTS

| 0 635 967 | 1/1995 | (EP) . |
| 0 695 077 | 1/1996 | (EP) . |

* cited by examiner

*Primary Examiner*—Yon J. Couso
(74) *Attorney, Agent, or Firm*—Foley & Lardner

(57) ABSTRACT

An image forming apparatus comprises first function for scanning the image of a document placed on a document table and storing it in a memory area, a designating function for asking whether or not the next document is present to an operator of the apparatus by indicating a screen thereafter and designating whether or not the next document is present according to the instruction of the operator, and a function for scanning and storage of the document image again when the operator designates the presence of the next document, and forming an image on an image medium based on the image stored as the final document when the operator designates the absence of the next document.

6 Claims, 15 Drawing Sheets

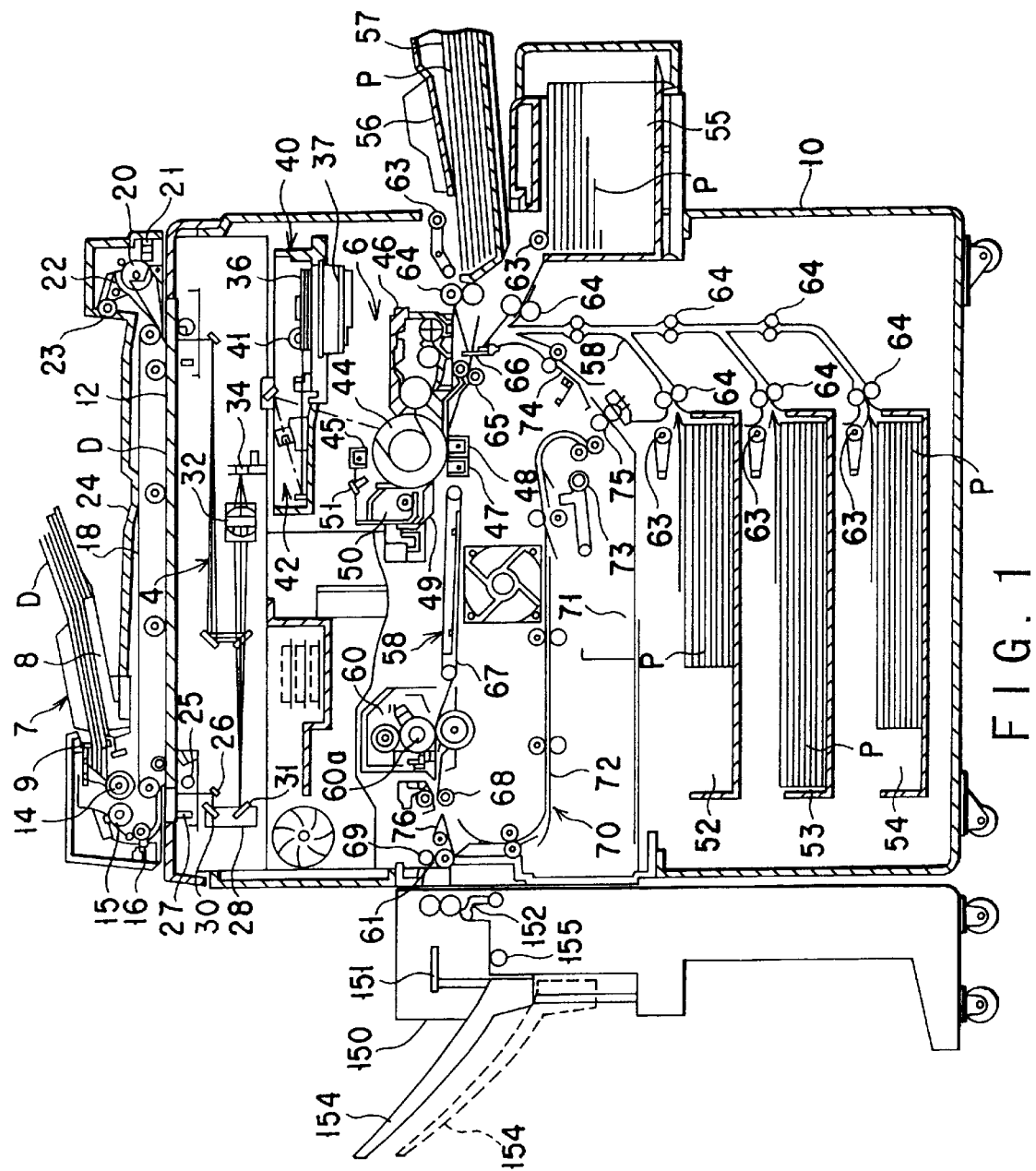
F I G. 1

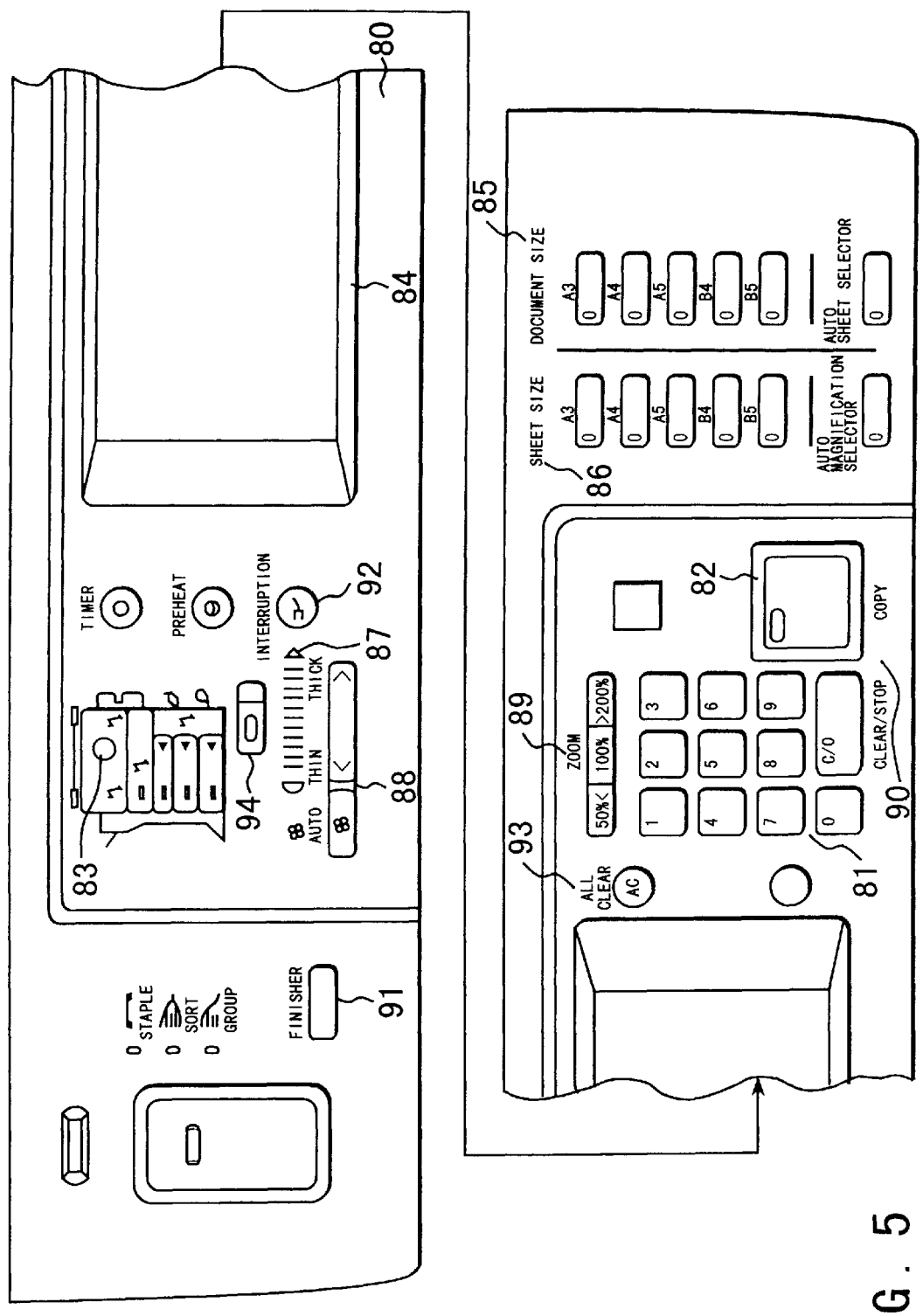
F I G. 5

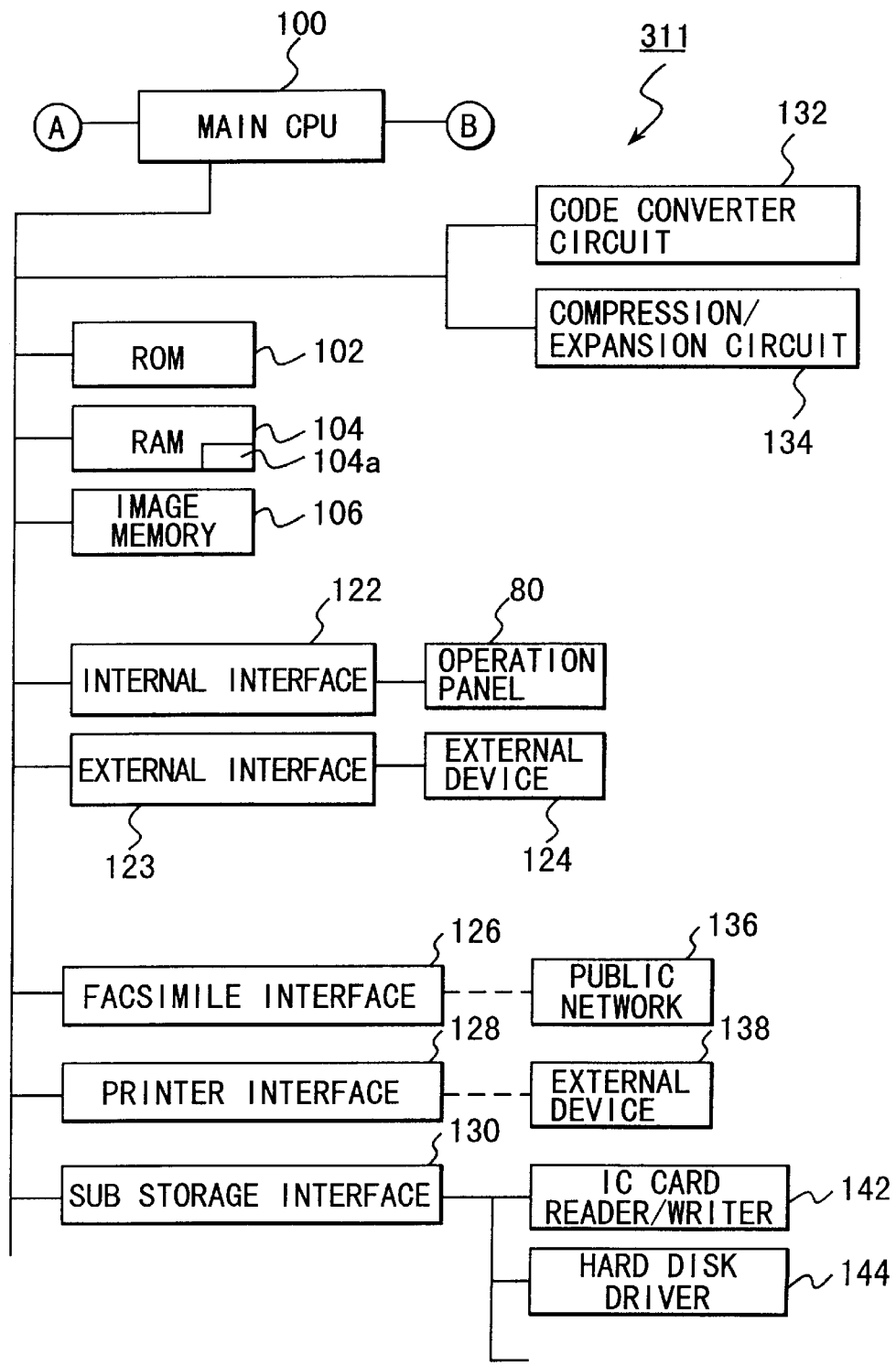
F I G. 10

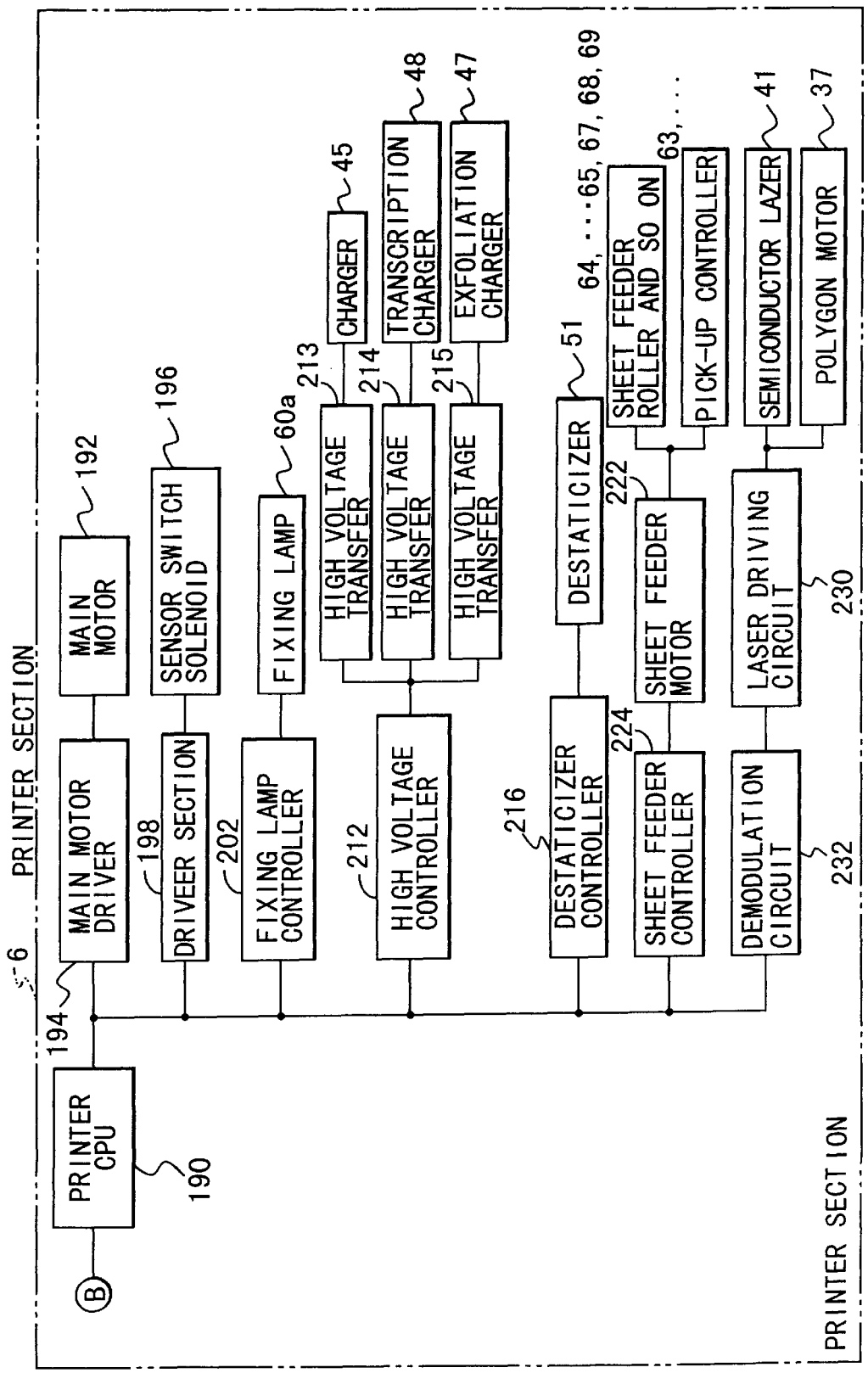
F I G. 11

IMAGE FORMING APPARATUS FOR STORING DOCUMENT IMAGE IN MEMORY BY ONE DOCUMENT FEEDING OPERATION AND THE METHOD THEREOF

BACKGROUND OF THE INVENTION

The present invention relates to an image forming apparatus, such as a copying machine, for obtaining a copy image of a document by electronic sorting or memory editing copying.

Conventionally, document inputting control of image forming apparatus are adopted following methods for determining whether or not the document is the last one.

(1) When the automatic document feeder (ADF) is in use

Each time the document feeding operation finishes, presence of a document on the ADF is detected by an optical sensor. Since all documents are to be placed on the ADF at the same time as the basic premise except a special mode, if no document is placed on the ADF at the time of starting scanning after a document feeding operation, the document to be scanned is determined to be the last one.

(2) When the ADF is not in use

Without the ADF for successive automatic paper feeding, the criterion of determining the presence of the next document depends solely upon detecting whether or not the user sets a document and depresses the copy key. However, by having the absence of the user's depressing the copy key as the criterion of no waiting document, whether or not the copy key has not been operated in a certain time needs to be detected in order to make judgment that the copy key has not been depressed. Therefore, a certain time is required for making the judgment of no waiting document.

In the case of the above-mentioned (1) the automatic document feeder (ADF) is in use, since the absence of the document on the ADF after inputting a document is judged that the preceding document is the last one, when a 4 in 1 function is used, by setting a document sheet one by one, a reduced copy of a quarter size is outputted each time a document is set.

In the case of (2) the automatic document feeder (ADF) is not in use, since a certain time is required for the judgment of no waiting document, it leads to a problem of deteriorating operativity.

BRIEF SUMMARY OF THE INVENTION

An object of the present invention is to provide an image forming apparatus capable of designating whether or not the next document (last document) is present easily and securely without the risk of mishandling in the document manual placing mode or the one document feeding mode with the automatic document feeder in the image formation using the page memory.

An image forming apparatus of the present invention comprises means for scanning the image of a document placed on a document table and storing it in a memory area; means for asking whether or not the next document is present to an operator of the apparatus by indicating a screen after processing by the means and designating whether or not the next document is present according to the instruction of the operator; means for performing the processing of the scanning means again when the asking means designates the presence of the next document; and forming means for forming an image on an image medium based on the image stored in the memory area of the reading means when the asking means designates the absence of the next document.

The present invention is to ask an operator about whether or not the next document is present on an operation panel for each document sheet using a page memory without the ADF continuously according to the above-mentioned configuration. That is, for example, "IS NEXT DOCUMENT PRESENT?", "YES", "NO" messages are indicated on a screen so that the operator needs only to depress the YES key if the next document is present or the NO key if the document being processed is the last one. Therefore, an image forming apparatus capable of designating the last document easily and securely in a dialogue style of the operator with the operation panel unlike conventional products where the operator needs to know the position of special keys, such as an end key can be provided.

Furthermore, similarly, as to a method of the present invention, an image forming method capable of designating the last document easily and securely can be provided.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic diagram of a digital copying machine for describing the first embodiment of the present invention;

FIG. 5 is a plan view showing the configuration of an operation panel;

FIG. 10 is a block diagram showing configuration outline of a basic section CPU;

FIG. 11 is a block diagram showing configuration outline of a printer section;

DETAILED DESCRIPTION OF THE INVENTION

Figure 2:
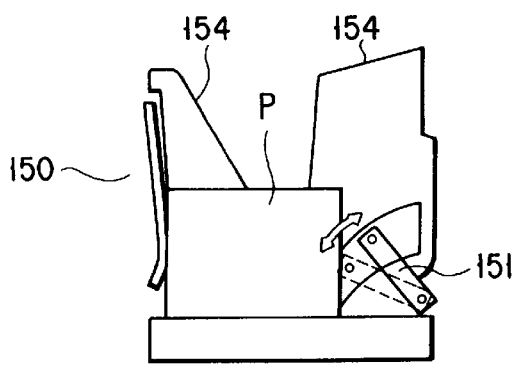
FIG. 2 is a diagram for describing a finisher.

Hereinafter the present invention will be described in further details with reference to drawings.

The present invention will be described with reference to an embodiment comprising a complex type image forming apparatus having three functions of a copying machine (PPC), a facsimile (FAX), and a printer (PRT).

FIG. 1 is a block diagram illustrating the internal configuration of a digital copying machine for describing the first embodiment of the present invention.

The digital copying machine shown in FIG. 1 comprises an apparatus main body 10 wherein a scanner section 4 which performs as a reading means later described and a printer section 6 which performs as an image forming means are provided.

A document table 12 comprising transparent glass on which an object to be read out, namely, a document D is mounted is provided on the upper surface of the apparatus main body 10. Further, an automatic document feeder (hereinafter abbreviated as ADF) 7 for automatically feeding documents onto the document table 12 is provided on the upper surface of the apparatus main body 10. The ADF 7 which is capable of being open or close with respect to the document table 12, also functions as an original cover for putting the document D mounted on the document table 12 closely onto the document table 12.

The ADF 7 comprises a document tray 8 on which the documents D are set, an empty sensor 9 for detecting the presence of a document, a pick-up roller 14 for picking up documents from the document tray 8 one by one, a sheet feeder roller 15 for conveying the pickedup document, an aligning roller pair 16 for aligning the edge of the document, and a conveying belt 18 arranged so as to cover substantially the entire document table 12. A plurality of documents set on the document tray 8 upward are picked up from the lowest page, that is, the last page and after being aligned by the aligning roller pair 16, conveyed to a predetermined position on the document table 12 by the conveying belt 18.

On the opposite end to the aligning roller pair 16 with respect to the conveying belt 18 in the ADF 7 are a reversing roller 20, an irreversible sensor 21, a flapper 22, and a paper discharging roller 23. A document D of which image information read out by the scanner section 4 later described is fed out from the document table 12 by the conveying belt 18 so as to be discharged onto a document discharging section 24 on the upper surface of the ADF via the reversing roller 20, the flapper 21, and the paper discharging roller 22. In the case the back side of the document D is to be read out, the document conveyed by the conveying belt 18 is reversed by the reversing roller 20 by switching the flapper 22 and conveyed to the predetermined position of the document table 12 by the conveying belt 18 again.

A one document feeding key 11a for designating a one document feeding mode is arranged on a paper feeding side cover 11 of the ADF.

The scanner section 4 arranged in the apparatus main body 10 comprises an exposure lamp 25 as a light source for lighting a document D mounted on the document table 12 and a first mirror 26 for deflecting a light beam reflected from the document D to a predetermined direction. The exposure lamp 25 and the first mirror 26 are mounted on a first carriage 27 arranged below the document table 12.

The first carriage 27, which is arranged movably parallel to the document table 12, is driven by a driving motor via a toothed belt (not illustrated) so as to reciprocate below the document table 12.

Further, a second carriage 28, which is arranged movably parallel to the document table 12 is provided below the document table 12. Second and third mirrors 30, 31, arranged perpendicular to each other, for successively deflecting the light beam reflected from the document D and deflected by the first mirror 26 are mounted on the second carriage 28. The second carriage 28 is driven by the toothed belt for driving the first carriage 27 following the movement of the first carriage 27, and is moved at half a rate with respect to the first carriage 27 along the document table 12.

An image forming lens 32 for focusing a light beam reflected by the third mirror 31 on the second carriage 28 and a CCD sensor 34 for photoelectric conversion of the reflected light beam focused by the image forming lens 32 are provided below the document table 12. The image forming lens 32 is provided in a plane including the optical axis of a light beam deflected by the third mirror 31 movably via a driving mechanism so that a reflected light beam can form an image at a desired magnification by the movement of the image forming lens 32. The CCD sensor 34 converts an incident reflected light beam photoelectrically and outputs an electric signal corresponding to the read-out document D.

On the other hand, the printer section 6 comprises a laser exposure device 40, which serves as a latent image forming means. The laser exposure device 40 comprises a semiconductor laser 41 as the light source, a polygon mirror 36 as the scanning member for continuously deflecting a light beam outputted from the semiconductor laser 41, a polygon motor 37 as the scanning motor for driving the polygon mirror 36 at a predetermined rotation frequency later described, and an optical system 42 for deflecting and introducing the laser beam from the polygon mirror 36 to a light-sensitive element drum 44 later described. The laser exposure device 40 of the above-mentioned configuration is fixed and supported by a supporting frame (not illustrated) of the apparatus main body 10.

The semiconductor laser 41 is on-off controlled according to the image information of a document D read out by the scanner section 4 or the incoming or outgoing facsimile document information. The laser light beam is directed to the light-sensitive element drum 44 via the polygon mirror 36 and the optical system 42 so as to form an electrostatic latent image on the peripheral surface of the light-sensitive element drum 44 by scanning the light-sensitive element drum 44.

The printer section 6 comprises the rotatable light-sensitive element drum 44 arranged substantially in the center of the apparatus main body 10 as an image carrier, of which peripheral surface is exposed by a laser beam from the laser exposure device 40 for forming a desired electrostatic latent image. In the vicinity of the light-sensitive element drum 44 are a charger 45 for electrifying the drum peripheral surface to a predetermined charge, a developer 46 for supplying a toner as a developer to the electrostatic latent image formed on the peripheral surface of the light-sensitive element drum 44 for developing at a desired image density, an exfoliation charger 47 for separating a material to be transferred fed from a paper cassette later described, that is, a copying paper P from the light-sensitive element drum 44, a transcription charger 48 for transferring the toner image formed on the light-sensitive element drum 44 onto the paper P, an exfoliation nail 49 for separating the copying paper P from the peripheral surface of the light-sensitive element drum 44, a cleaning device 50 for cleaning a toner remained on the peripheral surface of the light-sensitive element drum 44, and a destaticizer 51 for eliminating the charge of the peripheral surface of the light-sensitive element drum 44.

A drawable upper cassette 52, a drawable middle cassette 53, and a drawable lower cassette 54, loaded with copying papers of different sizes, are arranged like layers at a lower part of the apparatus main body 10. A mass storage feeder 55 is provided aside the cassettes for storing about 3,000 sheets of copying papers P of the frequent use, such as A4 size papers. A detachable sheet feeder cassette 57, which also serves as a manual feeding tray 56, is mounted above the mass storage feeder 55.

A conveying path 58 is provided elongating from the cassettes and the mass storage feeder 55 through a transfer section between the light-sensitive element drum 44 and the transcription charger 48. A fixing device 60 having a fixing lamp 60a is arranged at the end of the conveying path 58. A discharging opening 61, which is provided with a finisher 150 of a single tray, is formed at the side wall facing to the fixing device 60 of the apparatus main body 10.

Pick-up rollers 63 for picking up a paper P one by one are arranged in the vicinity of the upper cassette 52, the middle cassette 53, the lower cassette 54 and the sheet feeder cassette 57, respectively. A plenty of sheet feeder roller pairs 64 for conveying copying papers P picked up by the pick-up rollers 63 are arranged in the conveying path 58.

A resist roller pair 65 is provided upstream of the light-sensitive element drum 44 in the conveying path 58. The resist roller pair 65 is for correcting the inclination of the picked-up copying paper P as well as for aligning the edge of the toner image on the light-sensitive element drum 44 and the edge of the copying paper P and feeding the copying paper P to the transfer section at the rate the same as the movement of the peripheral surface of the light-sensitive element drum 44. Before the resist roller pair 65, that is, at the side of the sheet feeder roller 64, is a pre-aligning sensor 66.

A copying paper P picked up one by one from the cassettes or the mass storage feeder 55 by the pick-up roller 63 is conveyed to the resist roller pair 65 by the sheet feeder roller pairs 64. The copying paper P is conveyed to the transfer section after having the edge aligned by the resist roller pair 65.

A developer image formed on the light-sensitive element drum 44, that is, a toner image is transferred on a paper P by the transcription charger 48 in the transfer section. The copying paper P having the toner image transferred thereon is removed from the peripheral surface of the light-sensitive element drum 44 by the exfoliation charger 47 and the exfoliation nail 49, and conveyed to the fixing device 60 via the conveying belt 67 partially comprising the conveying path 58. After having the developer image fixed on the copying paper P by the fixing device 60, the copying paper P is discharged onto the finisher 150 via the discharging opening 61 by the sheet feeder roller pair 68 and the paper discharging roller pair 69.

An automatic both sides device 70 for reversing and sending the copying paper P passed through the fixing device 60 to the resist roller pair 65 again is provided below the conveying path 58. The automatic both sides device 70 comprises a temporary stacking section 71 for temporarily stacking the copying paper P, a reversing path 72 branching from the conveying path 58 for reversing and introducing the copying paper P passed through the fixing device 60 to the temporary stacking section 71, a pick-up roller 73 for picking up the copying paper P stacked in the temporary stacking section 71 one by one, and a sheet feeder roller 75 for feeding the picked up paper to the resist roller pair 75 via a conveying path 74. A sorting gate 76 for selectively sorting the copying paper P to the discharging opening 61 or the reversing path 72 is provided at the branch point of the conveying path 58 and the reversing path 72.

In the case of the both side copying, the copying paper P passed through the fixing device 60 is introduced to the reversing path 72 by the sorting gate 76 and is temporarily stacked in the temporary stacking section 71 in the reversed state. Then it is conveyed to the resist roller pair 65 via the conveying path 74 by the pick-up roller 73 and the sheet feeder roller pair 75. The copying paper P is aligned by the resist roller pair 65, then conveyed to the transfer section again so that a toner image is transferred on the back side of the copying paper P. The copying paper P is discharged to the finisher 150 via the conveying path 58, the fixing device 60 and the paper discharging roller 69.

Figure 3:
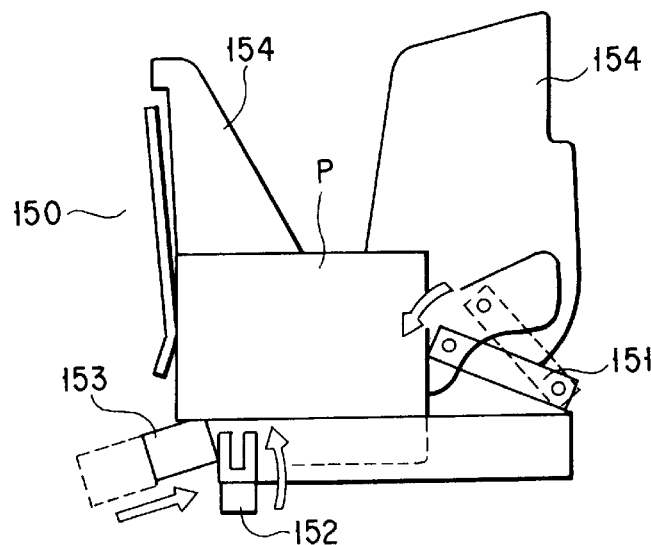
FIG. 3 is a diagram for describing the finisher.
Figure 4:
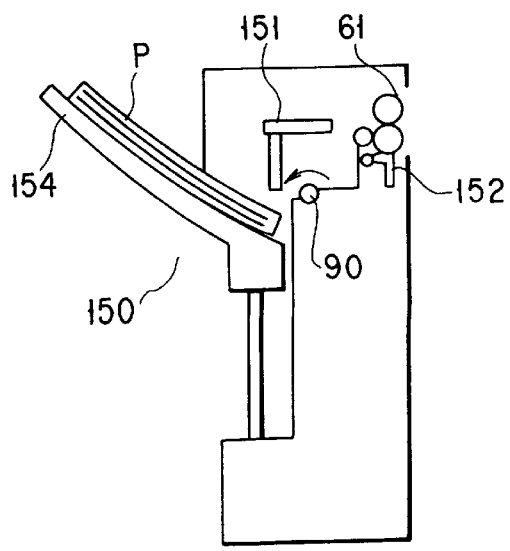
FIG. 4 is a diagram for describing the finisher.

The finisher 150 is for stabling and storing each set of discharged documents. As shown in FIG. 2, whenever a copying paper P to be stapled is discharged from the discharging opening 61, it is aligned by gathering at the side to be stapled by a guide bar 151. After discharging all the papers, a paper pressing arm 152 presses one set of the discharged copying papers P so as to be stapled by a stapler unit 153. Then the guide bar 151 lowers to the position shown by a broken line in FIG. 3, and each set of the stapled copying papers P is discharged to a finisher discharging tray 154 by a finisher discharging roller 155 as shown in FIG. 4. The amount of lowering the finisher discharging tray 154 is defined according to the number of the copying papers P to be discharged to some extent, so as to lower stepwise as each set is discharged. The guide bar 151 for aligning the discharged copying papers P is arranged at a position not to contact with the stapled copying papers P on the finisher discharging tray 154.

The finisher discharging tray 154 is connected to a shift mechanism (not illustrated) for shifting (for example, to the four directions including back, forth, right and left) each one in a sort mode.

An operation panel 80 for inputting various copying conditions and copying starting signals for starting copying operation is provided at an upper front part of the apparatus main body 10.

As shown in FIG. 5, the operation panel 80 comprises ten keys 81, a copy key 82, a state indicating section 83, a liquid crystal indicating section 84, a document size setting key 85, a sheet size setting key 86, a density indicating section 87, a density setting section 88, a magnification setting key 89, a clear/stop key 90, a finisher key 91, an interrupting key 92, an all clear key 93, and a cassette selecting key 94.

The ten keys 81 are for setting the document number or the copying number.

The copy key 82 is for instructing the start of copying.

The state indicating section 83 is for indicating the selection state of the paper feeding cassette or jamming of a document or a copying paper.

The liquid crystal indicating section 84 is for indicating the document number of the copying number as well as indicating or informing the copying magnification or editing. The liquid crystal indicating section 84 is provided with a touch panel for inputting various operation instructions.

Figure 6:
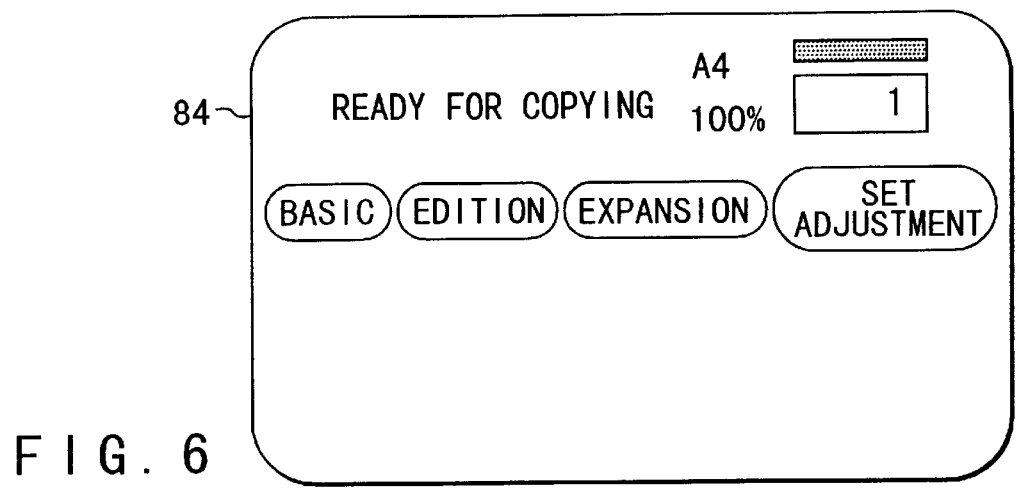
FIG. 6 is a diagram showing an indication example of a liquid crystal indicating section.

For example, as shown in FIG. 6 a message of "READY FOR COPYING, A4, 100%, 1" is shown when not in use as well as a BASIC key, an EDITION key, an EXPANSION key, a SET ADJUSTMENT key are indicated for inputting.

When the EDITION key shown in the liquid crystal indicating section 84 is inputted, memory editing function can be selected and instructed among the 4 in 1 mode where four documents are copied on one sheet P, the 2 in 1 mode where two documents are copied on one sheet P, and the saddle stitch mode (magazine mode) where documents are copied with a page order like a book by the saddle stitch.

In the saddle stitch mode, for example, 8 pages of B5 size documents are copied on B4 size copying papers with the first page and the eighth page of the documents copied on the back side of the first B4 size copying paper and the second page and the seventh page copied on the front side thereof, and the third page and the sixth page copied on the back side of second B4 size copying paper and the fourth page and the fifth page copied on the front side thereof. By the saddle stitch of the copied papers, a copy like a book (magazine) having the first to eighth pages arranged in order can be obtained.

Figure 7A:
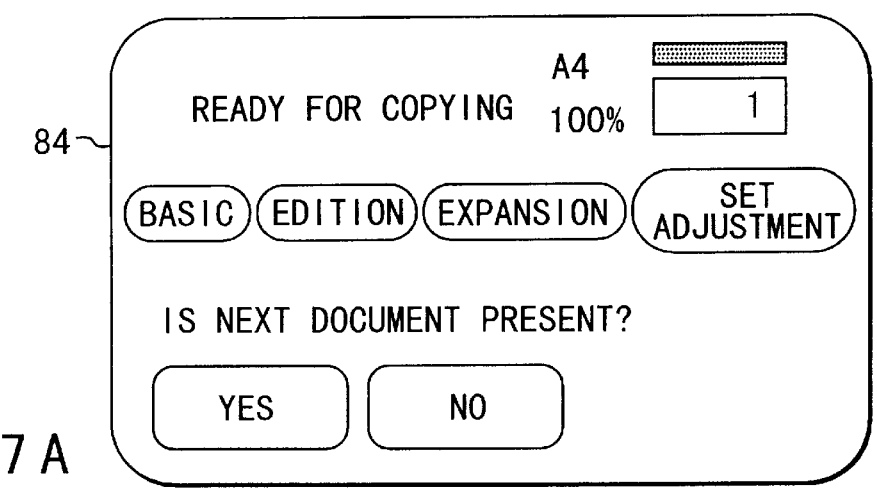
FIGS. 7A, 7B and 7C are diagrams showing an indication example of a liquid crystal indicating section.
Figure 7B:
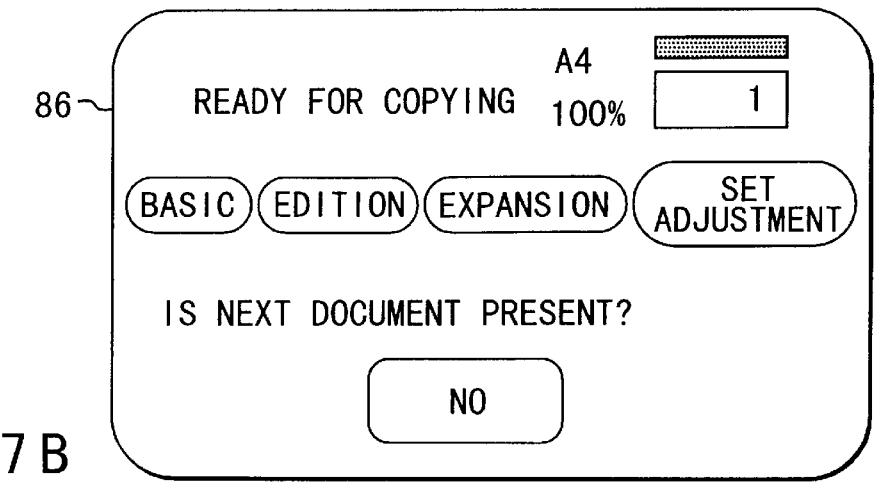
Figure 7C:
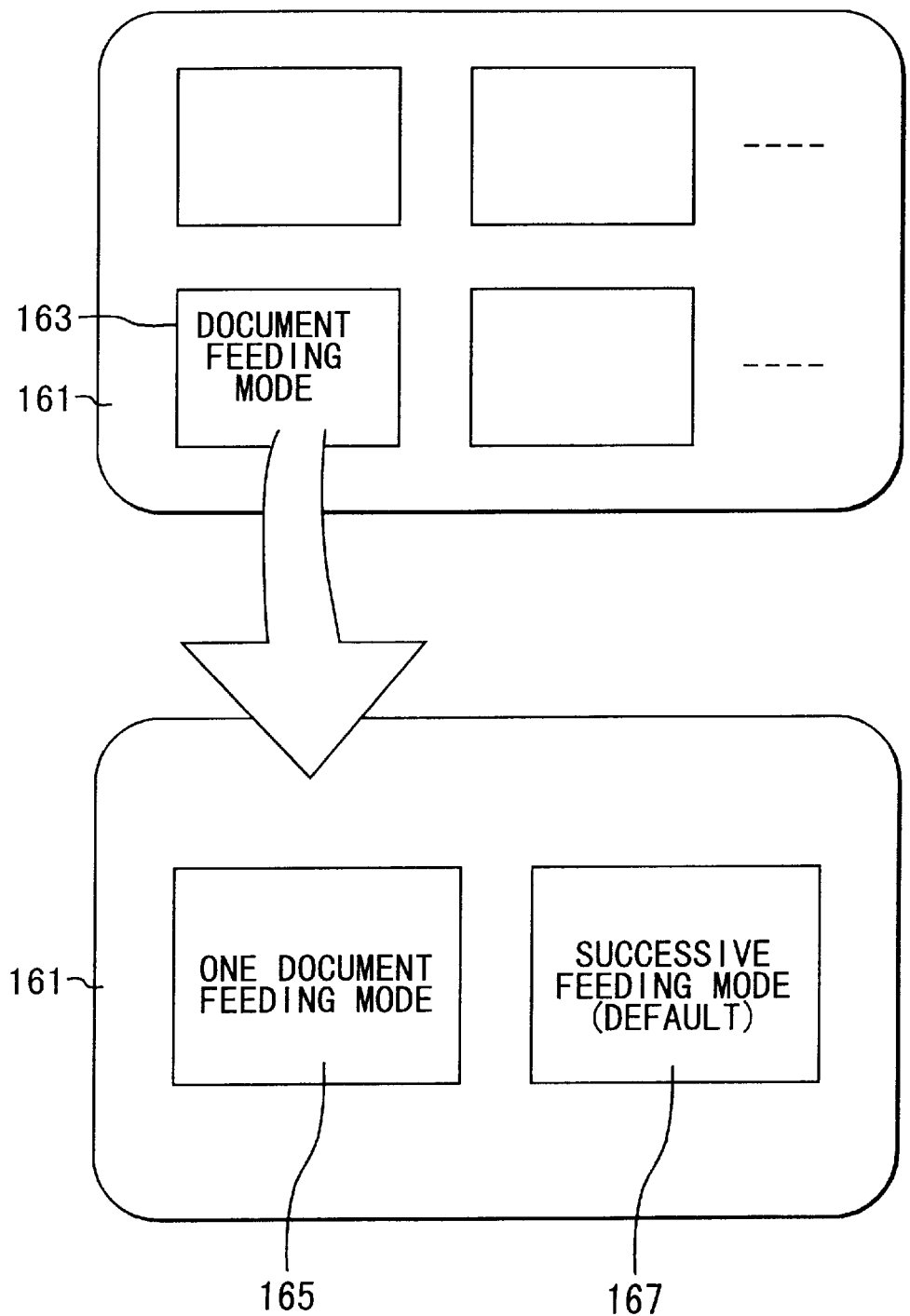

FIGS. 7A, 7B and 7C are diagrams showing an indication example of a liquid crystal indicating section.

When making a copy in processing in a mode of the above-mentioned memory editing function without using the ADF 7 or with the one document feeding mode of the ADF 7, a message of "IS NEXT DOCUMENT PRESENT?" is shown on the liquid crystal indicating section 84 as shown in FIG. 7A whenever the copy key 82 is depressed as well as the YES key and the NO key are indicated.

The YES key is to be depressed when a next document is present and the NO key is to be depressed when a next document is not present.

The case of indicating only the NO key as shown in FIG. 7B is also possible. In this case an operator is to depress the NO key only for the last document.

When the document feeding mode 161 is selected in the mode setting screen 161 as shown in FIG. 7C, a one document feeding mode 165 and a successive feeding mode (default) 167 are indicated.

The document size setting key 85 is to set the size of a document D.

The sheet size setting key 86 is to set the size of a paper P.

The density indicating section 87 is to indicate the copy density set by the density setting key 88.

The magnification setting key 89 is to set the copying magnification.

The clear/stop key 90 is to clear the content set by the ten keys 81 to reset to the standard state.

The finisher key 91 is to set the sorting modes including staple, sort, and group.

The interrupting key 92 is to set an interrupting copy.

The all clear key 93 is for stopping the operation.

The cassette selecting key 94 is to select the paper feeding cassettes 52, 53, 54, 55 for feeding the papers P.

Figure 8:
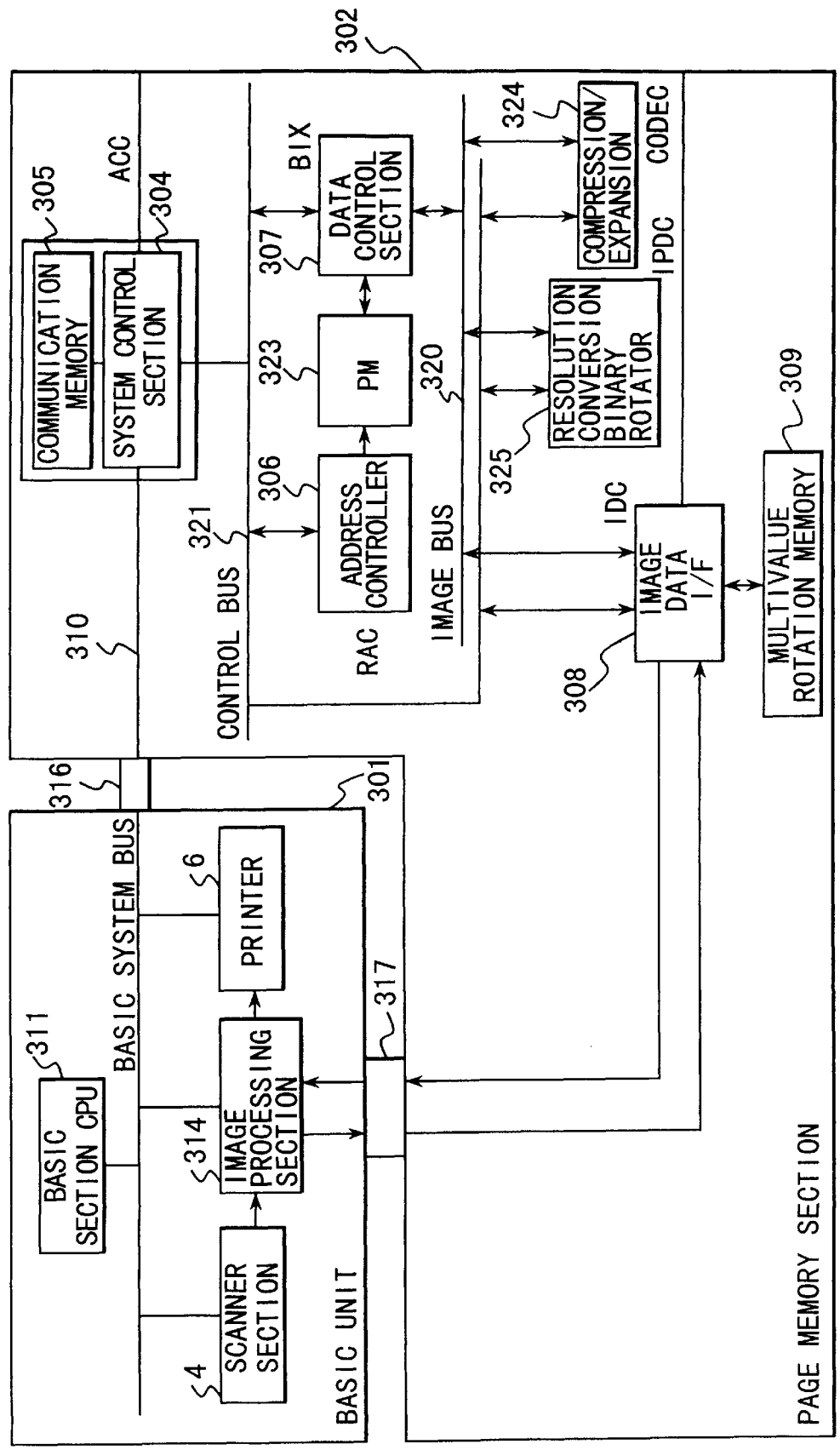
FIG. 8 is a block diagram showing configuration outline of a digital copying machine control system.
Figure 9:
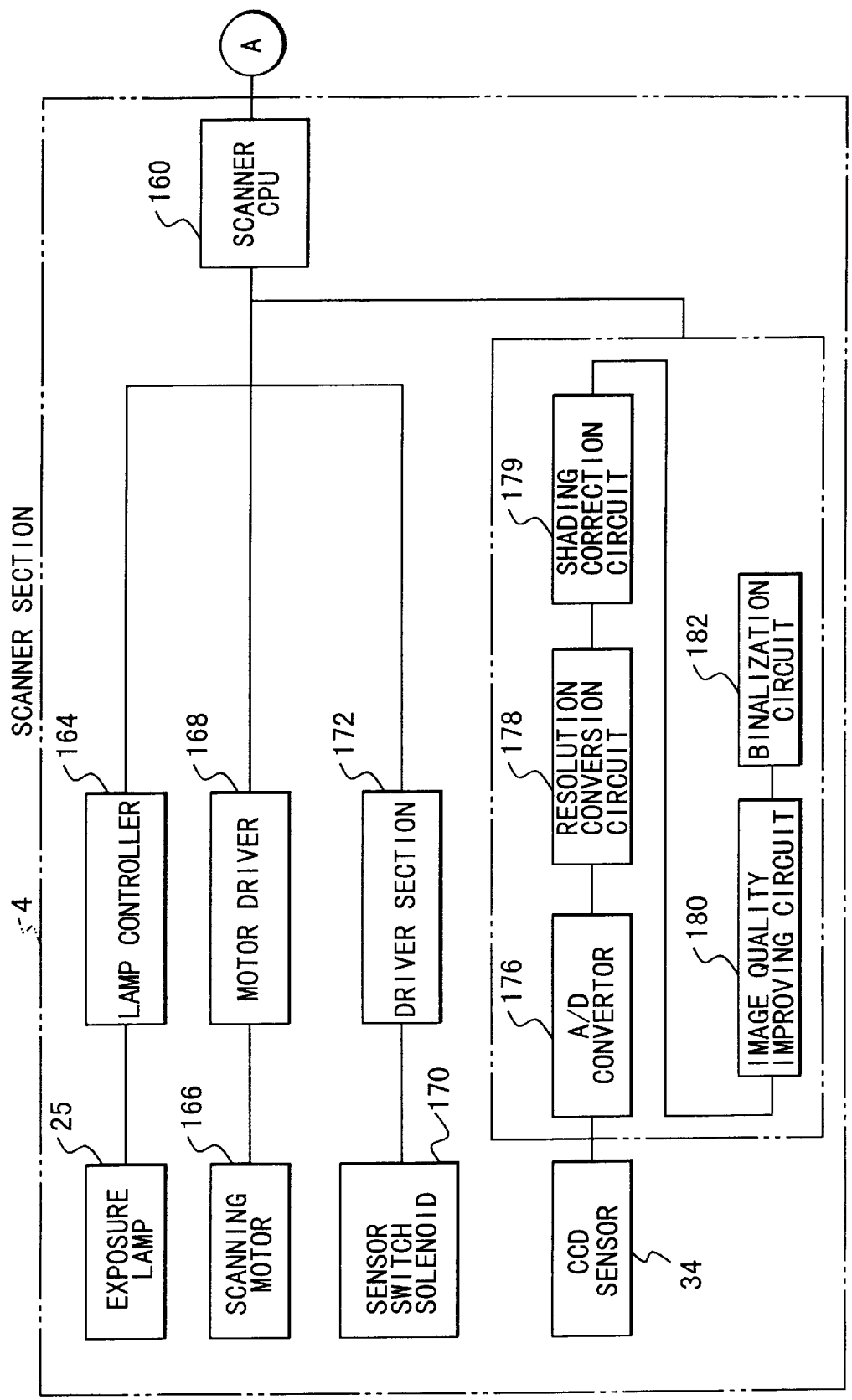
FIG. 9 is a block diagram showing configuration outline of a scanner section.

The control circuit of the image forming apparatus will be described with reference to FIGS. 8 to 11. FIG. 8 is a schematic diagram of the configuration block diagram of a digital copying machine control system of an embodiment, FIG. 9 shows a scanner section, FIG. 10 shows a basic section CPU and FIG. 11 shows a printer section.

A digital copying machine control system, which has the scanner section 4 and the printer section 6 connected by an image processing means 214, comprises two main blocks, that is, a basic unit 301 comprising the digital copying machine, and a page memory 302 for the memory copying (electronic sorting) by receiving and recording image data from the basic unit 301, and transferring the recorded image data again to the basic unit 301.

The basic unit 301 and the page memory 302 are connected with a basic unit system interface 316 and a basic section image interface 317 for the interchange of image data.

The basic unit 301 comprises an inputting means (scanner section) 4, an outputting means (printer section) 6, an image processing section 314, and a control means (basic section CPU) 311 for controlling them.

The main CPU 100 of the control means (basic section CPU) 311 is connected with a ROM 102, a RAM 104, an image memory 106, an internal interface 122, an external interface 123, a facsimile interface 126, a printer interface 128, a sub storage interface 130, a code converter circuit 132, and a compression/expansion circuit 134. The internal interface 128 is connected with the operation panel 80. The external interface 123 is connected with the above-mentioned ADF 7 as an external device. The facsimile interface 126 is connected with a public network 136. The printer interface 128 is connected with an external device 138. The sub storage interface is connected with an IC card reader/writer 142 and a hard disk driver 144.

Here recording and reading image information is conducted by the main CPU 100. For example, in recording the image information, the image information read out by the scanner section 4 by the control of the scanner CPU 160 is recorded in the image memory 106 by the instruction from the main CPU 100. The instruction from the main CPU 100 is carried out by defining a mode by the input from the operation panel 80 (key input) or the input from the one document feeding key 11a in the above-mentioned ADF 7.

A parameter table 104a is to be set in the RAM 104. Copying conditions set by the operation panel 80, etc. are to be recorded in the parameter table 104a. Conditions not set thereby will be dealt with predetermined values. Parameters included in the copying conditions are the number of copying, the document size, the paper sheet size, the magnification, the sorting mode, the 4 in 1 mode, the 2 in 1 mode, the saddle stitch mode, and the one document feeding mode of the ADF 7.

Configuration of the scanner section 4 will be described with reference to FIG. 9 in detail. The scanner CPU 160 of the scanner section 4 is connected with and controls a lamp controller 164 for controlling an exposure lamp 25, a motor driver 168 for controlling a scanning motor 166, and a driver section 172 for driving and controlling sensor, switch and solenoid 170, and furthermore, is connected with and controls an A/D converter 176 for processing the image information outputted from the CCD sensor 34, a resolution conversion circuit 178, a shading correction circuit 179, an image quality improving circuit 180, and a binarization circuit 182.

The printer section 6 will be described in detail with reference to FIG. 11. The printer CPU 190 of the printer section 6 is connected with and controls a main motor driver 194 for driving a main motor 192, a driver section 198 for driving and controlling sensor, switch, and solenoid 196, a fixing lamp controller 202 for controlling a fixing lamp 60a, a high voltage controller 212 for applying and controlling a high voltage from high voltage transfers 213, 214, 215 to a charger 45, a transcription charger 48, and an exfoliation charger 47, a destaticizer controller 216 for controlling a destaticizer 51, a sheet feeder controller 224 for controlling a sheet feeder motor 222 for sheet feeder roller pairs 64, . . . , 68, a resist roller pair 65, a conveying belt 67, a discharging roller pair 69, and a demodulation circuit 232 for controlling a laser driving circuit 230 for a semiconductor laser 41 and a polygon motor 37.

The page memory section 302 will be described with reference to FIG. 8. The page memory section 302 comprises a system control section 304 for controlling the access from the basic unit 301 to the page memory 323, a recording means (page memory) 323 for temporarily recording image data, an address controller 306 for generating the address of the page memory 323, an image bus 320 for data transfer among the devices in the page memory section 302, a control bus 321 for transfer of control signals between the devices in the page memory section 302 and the system control section 304, a data control section 307 for data transfer between the page memory 323 and the other devices via the image bus 320, an image data I/F 308 for interfacing image data for transferring the image data with the basic unit 301 via an image interface 317, a resolution conversion binary rotator 325 for converting image data to the resolution of another device when the image data is transmitted to the device having a different resolution, converting image data received from a device having a different resolution to the resolution of the printer section 6 of the basic unit 301, and conducting the 90 degree rotation processing of binary image data, a compression/expansion means 324 for compressing inputted image data or expanding compressed image data for visualizing via the printer section 6 for devices transmitting or recording image data after compression, such as facsimile transmission or optical disk recording, and a multivalue rotation memory 309 connected with the image data I/F 308 and used when the image data is outputted from the printer section 6 with the image data rotated by 90 degrees or −90 degrees.

Figure 12:
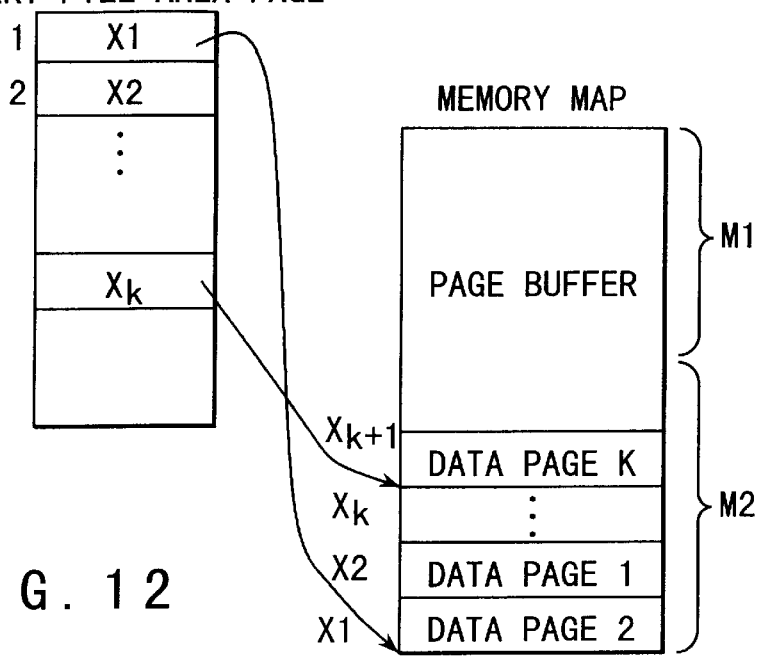
FIG. 12 is a diagram showing the relationship between a page buffer area M1 of a page memory and a file area M2.

As shown in FIG. 12, the page memory 323 is divided to a page buffer area M1 where image data of a document read out by the scanner section 4 are written and a file area M2 where the image data is compressed and separated by each page.

The head address of each page of the file area M2 is recorded in the data head address storage area M3 for every file area page.

The page memory 323 further comprises an image composing area M3 for an editing memory. Accordingly, for example, in the 4 in 1 mode, image data for four pages are successively stored in the page buffer area M1. The first document is reduced to the ¼ size and stored in the left upper area of the image composing area M3 divided in four, the second document is reduced to the ¼ size and stored in the right upper area of the image composing area M3 divided in four, the third document is reduced to the ¼ size and stored in the left lower area of the image composing area M3 divided in four, and the fourth document is reduced to the ¼ size and stored in the right lower area of the image composing area M3 divided in four successively. The composed image data stored in the image composing area M3 are read out by each line so as to be outputted to the printer section 6.

Figure 13A:
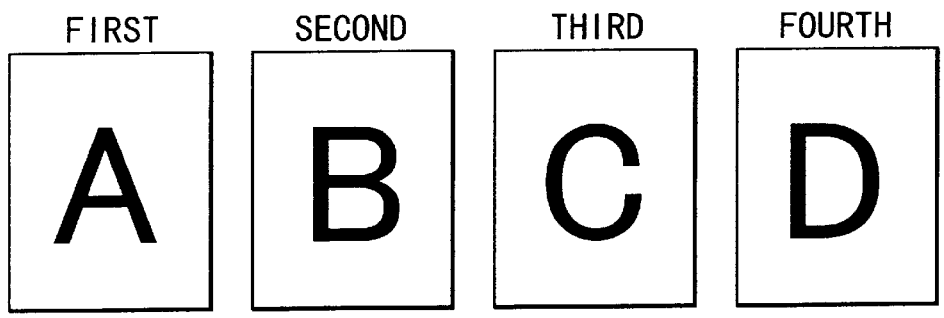
FIGS. 13A and 13B are diagrams showing an example of four documents for describing a 4 in 1 copy.
Figure 13B:
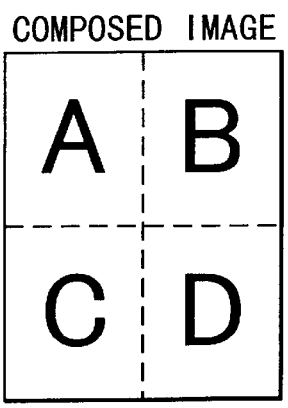

In this case, a copy (printed product) as shown in FIG. 13B can be obtained for four documents shown in FIG. 13A.

Figure 14:
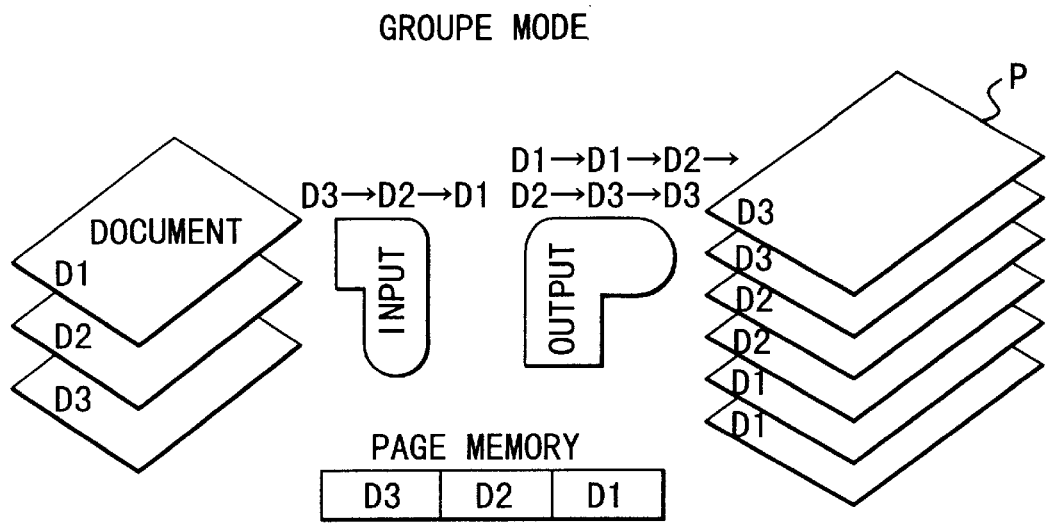
FIG. 14 is a diagram for describing copying in a group mode.
Figure 15:
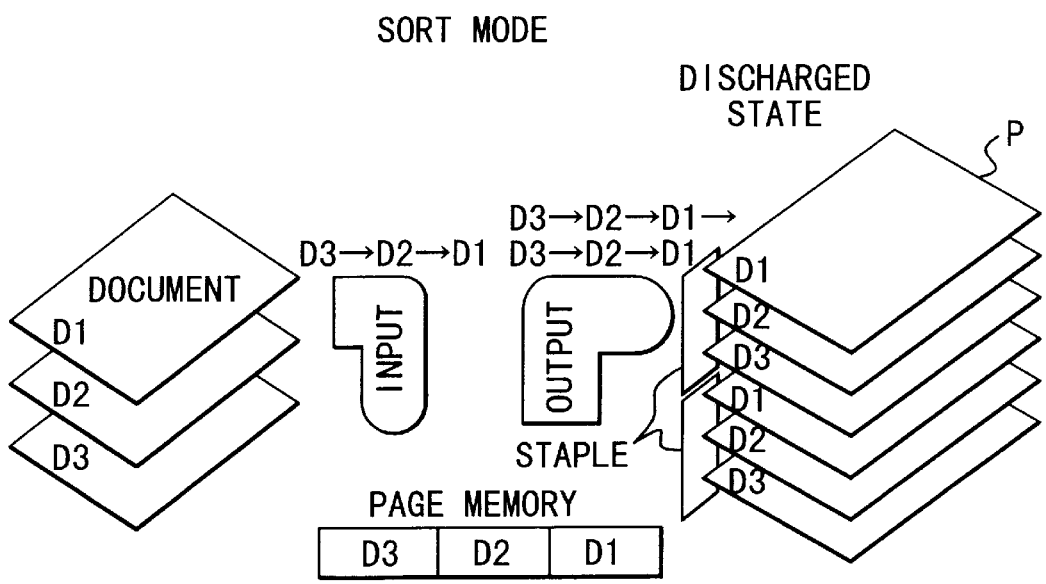
FIG. 15 is a diagram for describing copying in a sort mode.

The staple electronic sorting will be described with reference to FIGS. 14 and 15. FIG. 14 is a diagram for describing copying in a group mode. FIG. 15 is a diagram for describing copying in a sort mode.

As an example, the case of making two sets copy of 3 page documents will be presented.

In the group mode copying shown in FIG. 14, documents D are fed from the ADF tray 7 to the document reading position in the order of D3-D2-D1. By being read in the scanner section 4, the images will be stored in the page memory in the order of D3-D2-D1. Furthermore, according to the application, for example, by the printing combination, the images can be formed on copying papers P in the order of D1-D1-D2-D2-D3-D3. The copying papers P on which the images are formed are stacked on the finisher discharging tray 154 in the descending order of D1-D1-D2-D2-D3-D3.

In the electronic sort mode copying using staples shown in FIG. 15, the documents D are fed from the ADF 7 to the document reading position in the order of D3-D2-D1. By being read in the scanner section 4, the images will be stored in the page memory 323 in the order of D3-D2-D1. The images are outputted from the page memory 323 to the printer section 6 in the order of D3-D2-D1, stapled and discharged onto the tray. Similarly, the images are outputted from the page memory 323 to the printer section 6 in the order of D3-D2-D1, stapled and discharged onto the finisher discharging tray 154. The copying papers P discharged to the finisher discharging tray 154 are already stapled in the descending order of D1-D2-D3 so that an operator can have stapled two sets copy of the documents.

Figure 16A:
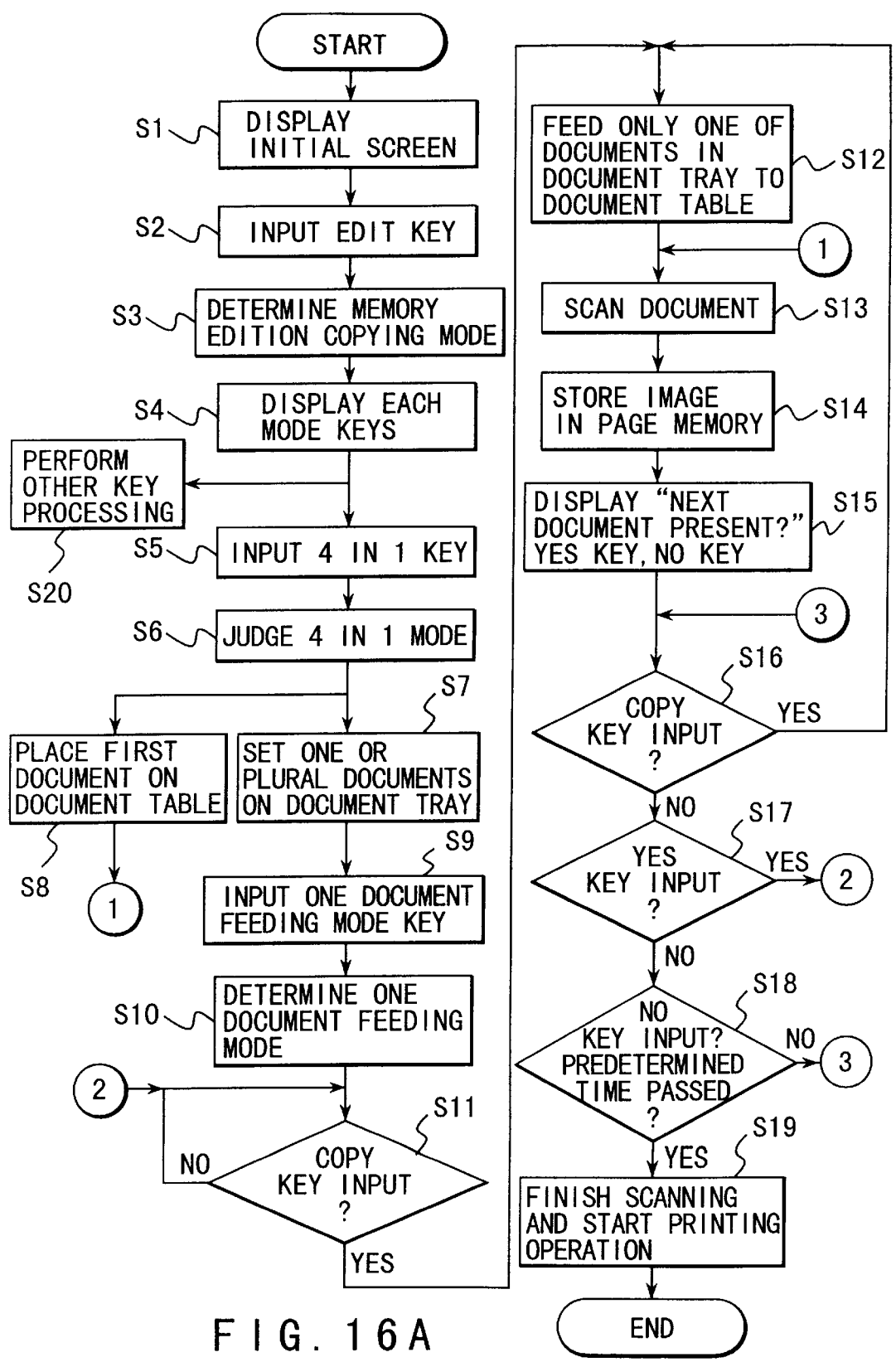
FIGS. 16A, 16B and 16C are flow charts for describing processing of 4 in 1.

The 4 in 1 processing in the above-mentioned configuration will be described with reference to the flow chart of FIG. 16A.

When the edit key is inputted (S2) with the initial screen indicated on the liquid crystal indicating section 84 of the operation panel 80 (S1), the main CPU 100 determines the memory edition copying mode (S3) and displays the 4 in 1 key, the 2 in 1 key, and the saddle stitch key on the liquid crystal indicating section 84 (S4). In the case the 4 in 1 key is inputted by the operator according to the display (S5), the main CPU 100 judges the 4 in 1 mode processing and ensures the page buffer area M1 and the image composing area M3 of the page memory (S6). If the 4 in 1 mode is not selected, normal processing is conducted (S20).

Then the operator sets one or plural documents on the document tray 8 (S7) or places the first document on the document table 12 (SB).

In the case documents are set on the document tray 8, by the input of the one document feeding mode key 11a by the operator (S9), the main CPU determined the one document feeding mode (S10).

In the case the main CPU 100 determines the input of the copy key 82 by the operator (S11), just one of the documents placed on the document tray 8 of the ADF 7 is conveyed by the one document feeding mode to be placed on the document table 12 (S12). After placing, the main CPU 100 functions the scanner section 4 for scanning the document on the document table 12 (S13). The main CPU 100 supplies the image data read out by the scanner section 4 to the page memory 323 via the image processing section 314, the basic section image interface 317, the image data interface 308, the image bus 320, and the data control section 307 successively to store the data in the page buffer area M1 of the page memory 323 (S14).

When the main CPU 100 starts reading operation by the scanner section 4, a message of "IS NEXT DOCUMENT PRESENT?", the YES key, and the NO key are displayed in the liquid crystal indicating section 84 as shown in FIG. 7A (S15).

When the operator input the copy key 82 with the message display on (S16), it returns to the step 12 so that the next document placed on the document tray 8 of the ADF 7 is placed on the document table 12. When the YES key is inputted with the above-mentioned message display on (S17), it returns to the step 11 so that the copy key 82 is inputted.

When the NO key is inputted with the above-mentioned message display of the step 15 or when a predetermined time (measured by a timer (not illustrated)) has passed (S18), the main CPU 100 judges the termination of scanning of the document by the scanner section 4 to start the print operation (S19).

In the 4 in 1 mode in the above-mentioned page memory 323, the image data for four pages are stored in the page buffer area M1 by being reduced and composed in the image composing area M3, and compressed and stored in the file area M2 as mentioned above.

When the main CPU 100 judges the termination of scanning of the document by the scanner section 4 by the NO key input, the image data stored in the page buffer area M1 are reduced and composed in the image composing area M3.

Accordingly, the image data are printed in the 4 in 1 mode by the image data stored in the file area M2 being expanded and outputted to the printer section 6, or by the image data stored in the image composing area M3 being outputted to the printer section 6.

Figure 17A:
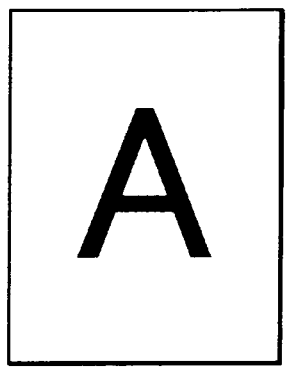
FIGS. 17A and 17B are diagrams showing an example of three documents for describing a 4 in 1 copy.
Figure 17A:
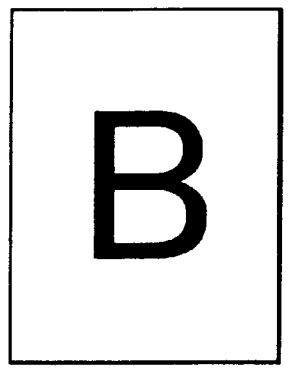
Figure 17A:
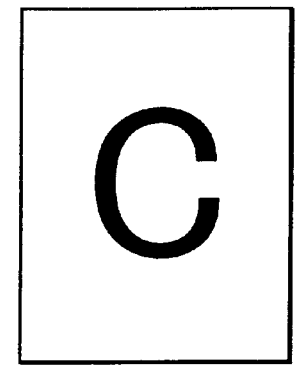
Figure 17B:
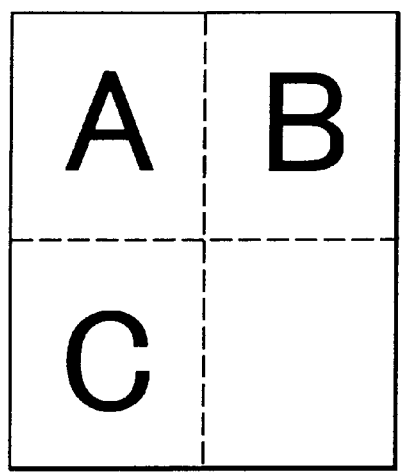

For example, if the NO key is inputted when the three pages shown in FIG. 17A are read out and the image data for the three pages are stored in the page buffer area M1, the image data for the three pages are composed by being reduced and stored in the image composing area M3 respectively. The image data are printed in the 4 in 1 mode with the fourth page blank as shown in FIG. 17B by printing the composed image data in the image composing area M3 in the printer section 6.

When the first document is placed on the document table 12 in the above-mentioned step 8, it proceeds to the step 13. The subsequent processes are conducted in the same manner. However, in the case the YES key is inputted in the step 17, it returns to the step 8 so that the next document is placed on the document table 12, and in the case the copy key 82 is inputted in the step 16, it returns to the step 13 so that the next document is scanned.

Accordingly, a message of "IS NEXT DOCUMENT PRESENT?" as well as the YES key and the NO key are indicated for each document. Since the apparatus can await the user's instruction (or document input) for each document, and the last document page can be designated explicitly by the user (by depressing the NO key), a desired result can be obtained in the 4 in 1 mode.

Although the operation in the 4 in 1 mode was explained in the above-mentioned embodiment, the present invention is not limited thereto, but the similar results can be obtained also in the 2 in 1 mode, the saddle stitch mode, and the electronic sort mode. That is, a message of "IS NEXT DOCUMENT PRESENT?" as well as the YES key and the NO key are indicated for each document in copying with a page memory. Since the apparatus can await the user's instruction (or document input) for each document, and the last document page can be designated explicitly by the user (by depressing the NO key), a desired result can be obtained in the electronic sort or the memory editing copy.

Figure 16B:
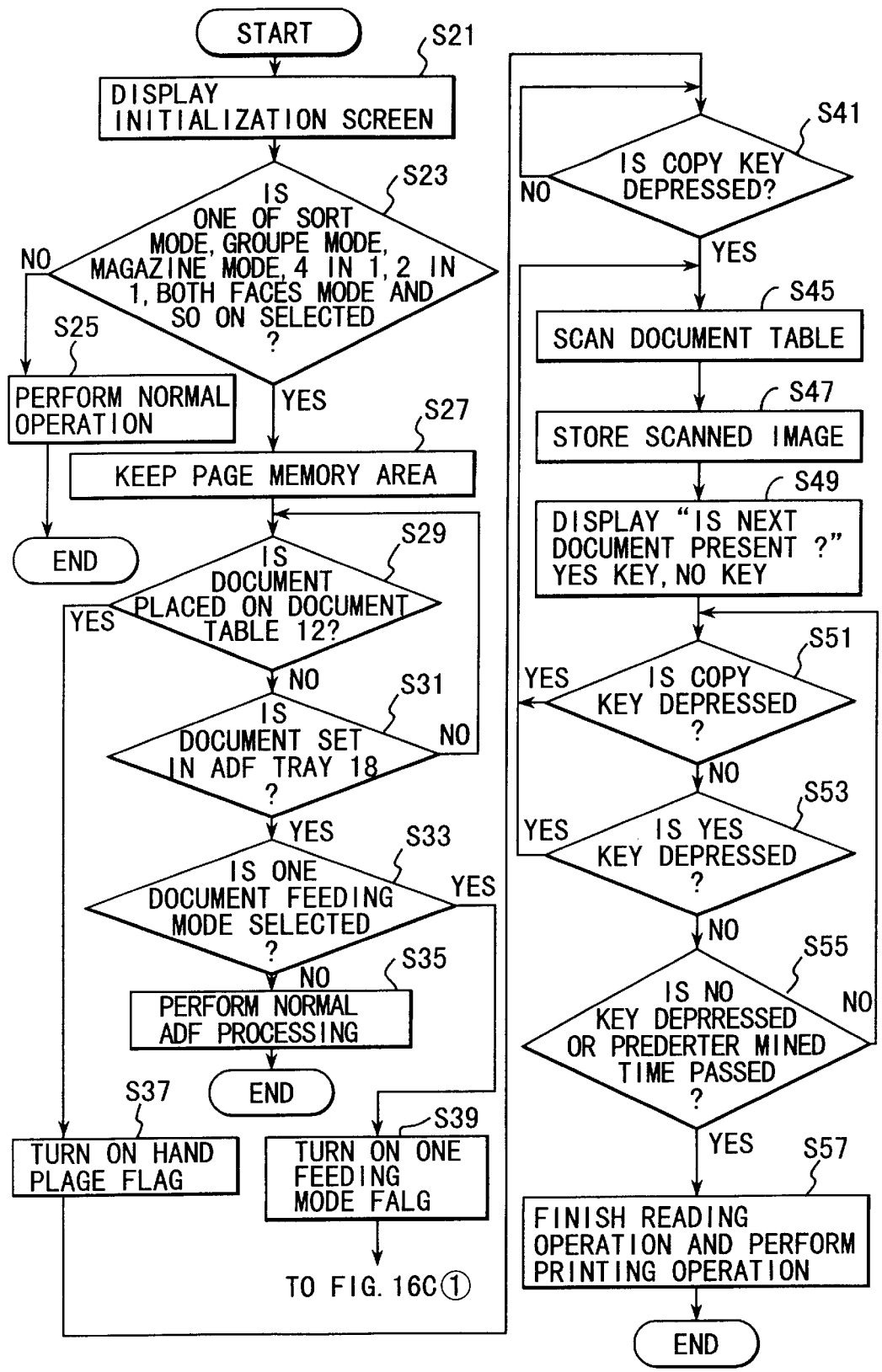

The processing in the other modes with the page memory but the 4 in 1 mode shown in the flow chart of FIG. 16A in the above-mentioned configuration will be described with reference to the flow charts of FIGS. 16B and 16C.

The initial screen is indicated on the liquid crystal indicating section 84 of the operation panel 80 (S21). The user can proceed the operation from the initial screen by setting a desired function mode. The judgment is made on whether or not the user select a mode which requires storage of the image data in the page memory, such as the sort mode, the group mode, the magazine mode, the 4 in 1 mode, the 2 in 1 mode, and the both side mode (S21) here. The main CPU 100 recognize and ensures the page buffer area M1 and the image composing area M3 of the page memory accordingly (S27). In the case none of these modes is selected, normal processing is conducted (S25) without performing the present invention.

Then judgment is made on whether or not the first document is placed on the document table 12 (S29). In the case a document is placed thereon, the main CPU 100 judges that it is the document manual placing mode to turn on the hand place flag (S37). If a document is not placed, further judgment is made on whether one or plural documents are set on the document tray 8 by the operator (S31). If the documents are set on the document tray 8, further judgment is made on whether or not the one document feeding mode 165 shown in FIG. 7C is selected by the operator (S33).

If the one document feeding mode 165 is selected, the one document feeding mode flag is turned on (S39). If it is not selected, the normal ADF processing is performed (S35).

Since the operation mode to be used in the processing has been clear until this stage, the processing operation will start by depressing the copy key 82 by the operator (S41).

Figure 16C:
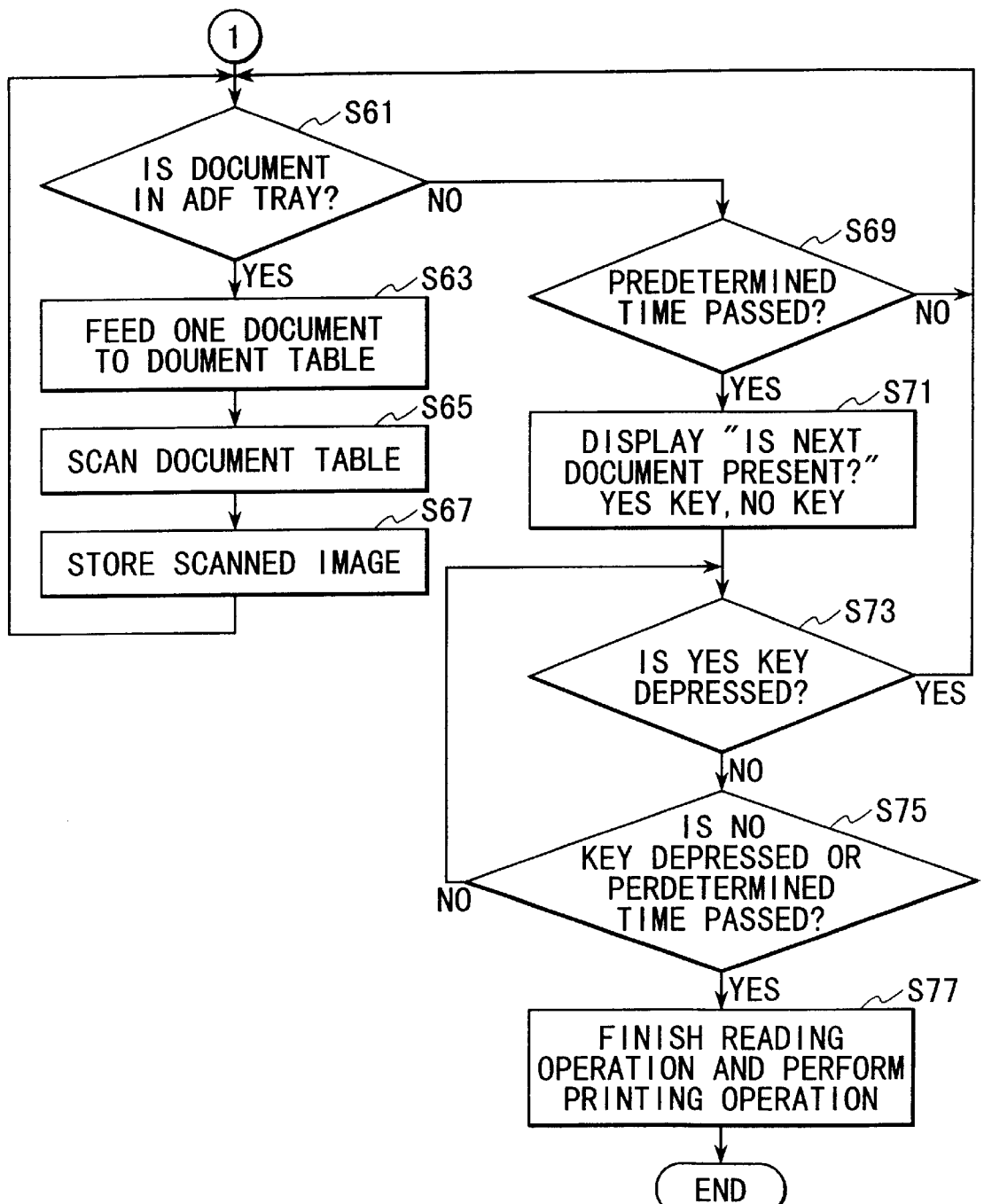

If it is the one document feeding mode, shown in FIG. 16C, if any document is detected on the document tray 8 (S61), the document placed on the document tray 8 of the ADF 7 is conveyed to be placed on the document table 12 (S63). After document conveyed, the main CPU 100 functions the scanner section 4 for scanning the document on the document table 12 (S65). The main CPU 100 supplies the image data read out by the scanner section 4 to the page memory 323 via the image processing section 314, the basic section image interface 317, the image data interface 308, the image bus 320, and the data control section 307 successively to store the data in the page buffer area M1 of the page memory 323 (S67).

And, the main CPU 100 repeats the steps of S63 to S67 till all the documents read is finished. When the main CPU 100 fails to detect the document in the document tray 8 of the ADF and predetermined time passed, a message of "IS NEXT DOCUMENT PRESENT?", the YES key, and the NO key are displayed in the liquid crystal indicating section 84 as shown in FIG. 7A (S71).

Next, whether or not the YES key is depressed is confirmed (S73). In the case the YES key is depressed, the same reading operation will be conducted (S61, S63, S65, S67).

If it is not depressed, whether or not the NO key is depressed is confirmed and at the same time, whether or not a predetermined time (measured by a timer (not illustrated)) has passed is confirmed. If it satisfied either condition, the main CPU 100 finishes the scanning operation of the document by the scanner section 4 to start the print operation according to the image data stored in the page memory based on the selected operation mode (S77).

According to the above-mentioned procedure, the documents on the document tray 8 of the ADF 7 are read out by the selected one document feeding mode with the input document to the document tray by the operator unlike the conventional products where the information is stored in the page memory as a whole.

In not only the one document feeding mode, but also in the manual placing mode, documents are read out in the same manner except that the step 43 process is not conducted. Accordingly, since the reading operation is conducted consecutively after depressing the copy key 82 by the operator after confirming the content of each document, the secure image data storage without mishandling in the reading operation can be achieved.

Although the operation in the sort mode, group mode, magazine sort, 4 in 1 mode, 2 in 1 mode, and both sides mode were explained in the above-mentioned embodiment, the present invention is not limited thereto, but can be used for any case of copying with a page memory.

That is, a message of "IS NEXT DOCUMENT PRESENT?" as well as the YES key and the NO key are indicated for each document in storing a document image in a page memory. Since the apparatus can await the user's instruction (or document input) for each document, and the last document page can be designated explicitly by the user by depressing the NO key, free document editing can be achieved in a sort mode or a group mode where the page memory is used.

As heretofore mentioned in detail, according to the present invention, since the last page of documents can be instructed to the apparatus after reading the page, an image forming apparatus, which provides an operation system capable of designating the last page easily and securely without the risk of mishandling in the manual placing mode without the automatic document feeder or in the one document feeding mode with the automatic document feeder for obtaining a copy image by the electronic sort function or the memory editing function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An image forming apparatus comprising:
   a conveyor that automatically conveys one or plural of documents loaded on a tray to a document table one by one;
   a judging unit that judges whether the image forming apparatus is in a manual placing mode where the document is placed on the document table by an operator without the conveyor when a document is placed on the document table before conveyance of the document by the conveyor;
   a first memory that stores an image on the document table when the judging unit has judged that the image forming apparatus is in the manual placing mode without functioning the conveyor according to consecutive operation of the operator;
   a first determining unit that determines whether or not the conveyance of the documents by the conveyor is conducted in a document feeding mode, which is based on the consecutive operation of the operator for each document;
   a second memory that conveys just one document loaded on the tray to the document table, that scans and stores the document image in the first memory when the first determining unit has determined to conduct the document feeding mode;
   a second determining unit that determines the selection of a plurality of image editing modes with the first memory for the document image according to the operator's instruction;
   a question display that indicates a question asking whether or not the next document is present, and a "YES" key and a "NO" key corresponding to the question on the operation panel after the selection of one of the image editing modes by the second determining unit and processing by the first and second memories, and that designates whether or not the next document is present according to the operator's instruction;
   a reprocessing unit that performs the process of the first memory or the second memory again when the question display designates the presence of the next document; and
   an image forming device that forms an image on an image medium based on the image stored in the first memory or the second memory when the question display designates the absence of the next document.

2. An image forming apparatus comprising:
   a scanner that scans an image of a document manually set on a document table;
   a memory that stores the scanned image by the scanner;
   an image forming device that forms an image on a sheet according to the scanned image stored in the memory;
   a display for providing a query to an operator as to whether or not a next document to be scanned is present after the scanner has scanned the image of the document;
   a key that designates whether or not the next document is present based on manual operation of the key by the operator; and
   a controller that controls the scanner so as to perform scanning of the next document and stores the scanned image of the next document in the memory and that controls the image forming device so as to not allow the image forming device to process the scanned image stored in the memory, when the key designates the presence of the next document, and that controls the image forming device and the memory so as to form an image of the sheet corresponding to the image stored in the memory and that halts the scanner from performing scanning, when the key designates the absence of the next document.

3. An image forming method, comprising the steps of:
   scanning, with a scanner, an image of a document manually set on a document table;
   storing, in a memory, the scanned image by the scanner;
   forming, with an image forming device, an image on a sheet according to the scanned image stored in the memory;
   providing a query to an operator, with a display, as to whether or not a next document to be scanned is present after the scanner has scanned the image of the document;
   designating, with a key, whether or not the next document is present based on manual operation of the key by the operator; and
   controlling the scanner so as to perform scanning of the next document and storing the scanned image of the next document in the memory and that controls the image forming device so as to not allow the image forming device to process the scanned image stored in the memory, when the key designates the presence of the next document, and controlling the image forming device and the memory so as to form an image of the sheet corresponding to the image stored in the memory and for halting the scanner from performing scanning, when the key designates the absence of the next document.

4. An image forming apparatus according to claim 2, wherein the controller prohibits the image forming device from forming an image on a sheet corresponding to the scanned image stored in the memory, until the key designates the absence of the next document.

5. An image forming method according to claim 3, wherein the controlling step prohibits the image forming device from forming an image on a sheet corresponding to the scanned image stored in the memory, until the key designates the absence of the next document.

6. An image forming method comprising the steps of:

automatically conveying, by a conveyor, at least one document loaded on a tray to a document table one by one;

judging whether the image forming apparatus is in a manual placing mode where the document is placed on the document table by an operator without the conveyor when a document is placed on the document table before conveyance of the document by the conveyor;

storing, in a first memory, an image on the document when the judging step has judged that the image forming apparatus is in the manual placing mode without functioning the conveyor according to consecutive operation of the operator;

determining whether or not the conveyance of the documents by the conveyor is conducted in a document feeding mode, which is based on the consecutive operation of the operator for each document;

conveying, by a second memory, a document loaded on the tray to the document table, and scanning and storing the document image in the first memory when the determining step has determined to conduct the document feeding mode;

determining the selection of a plurality of image editing modes with the first memory for the document image according to the operator's instruction;

displaying a question that asks whether or not the next document is present, and a "YES" key and a "NO" key corresponding to the question on the operation panel after the selection of one of the image editing modes by the selection determining step and processing by the first and second memories, and designating whether or not the next document is present according to the operator's instruction;

performing a reprocessing of the process of the memory or the second memory again when the displaying step designates the presence of the next document; and forming an image on an image medium based on the image stored in the first memory or the second memory when the displaying step designates the absence of the next document.

* * * * *